Dec. 18, 1923.
B. GALLSWORTHY
1,477,642
DISTILLING MATERIALS IN CONTACT WITH POROUS SUBSTANCES
Filed Nov. 7, 1919
2 Sheets-Sheet 2
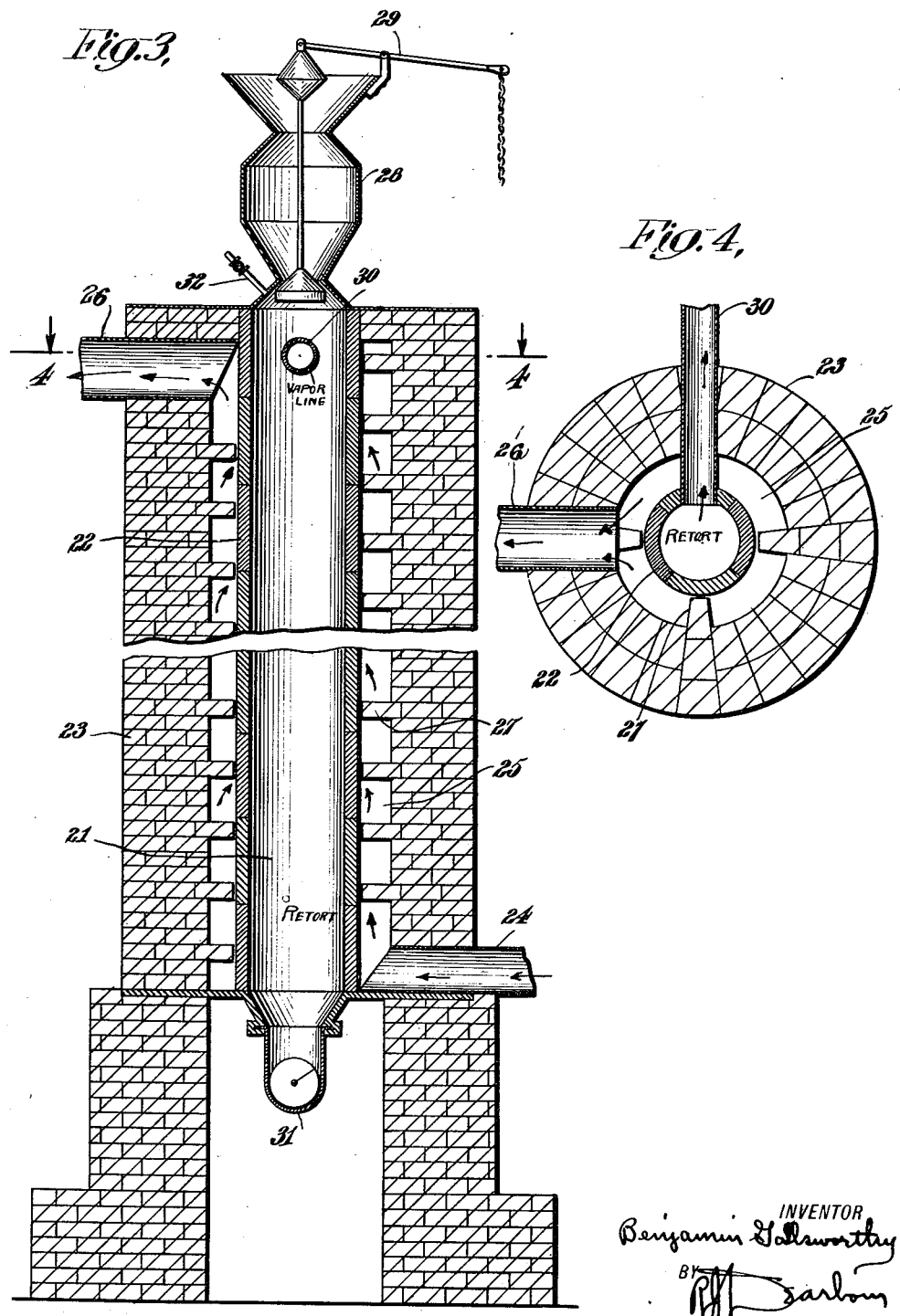
INVENTOR
Benjamin Gallsworthy
BY
ATTORNEY Patented Dec. 18, 1923.

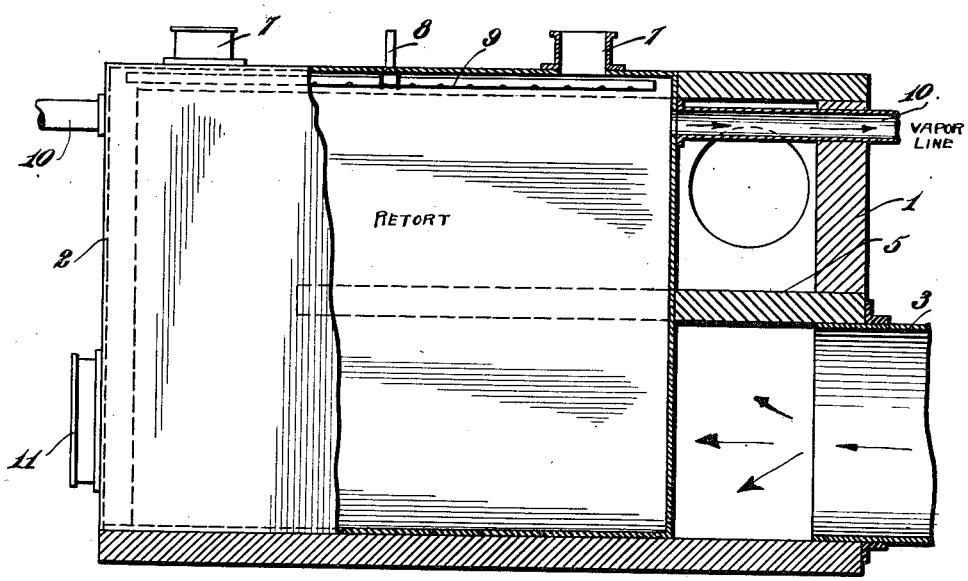
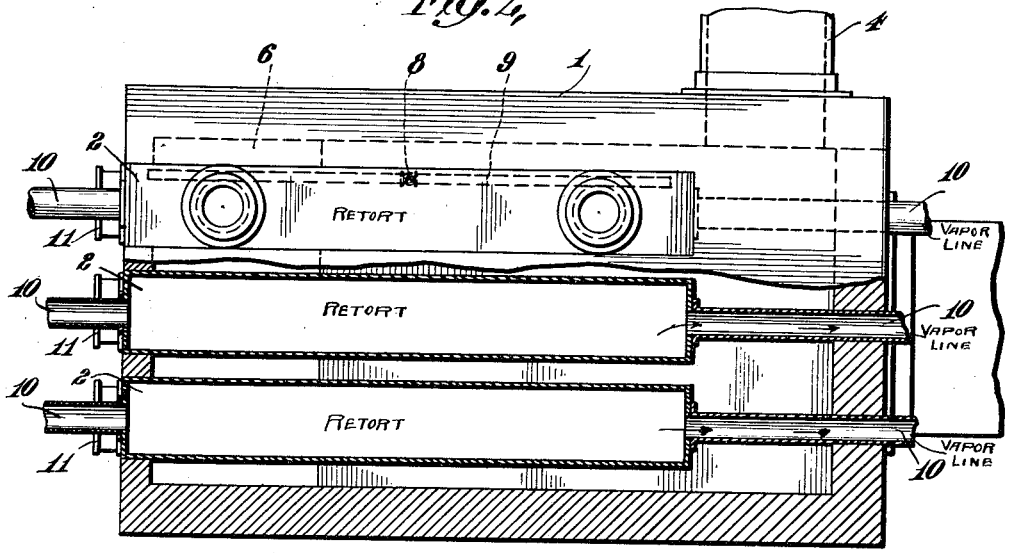

1,477,642

UNITED STATES PATENT OFFICE.

BENJAMIN GALLSWORTHY, OF TAMPICO, MEXICO, ASSIGNOR TO THE TEXAS COMPANY, A CORPORATION OF TEXAS.

DISTILLING MATERIALS IN CONTACT WITH POROUS SUBSTANCES.

Application filed November 7, 1919. Serial No. 336,425.

*To all whom it may concern:*

Be it known that I, BENJAMIN GALLSWORTHY, a subject of the Crown of Gt. Britain, residing in Tampico, in the State of Tamaulipas, Mexico, have invented certain new and useful Improvements in Distilling Materials in Contact with Porous Substances, of which the following is a specification.

Broadly and generally, my invention relates to the distillation of hydrocarbons in the presence of porous materials. More specifically, it pertains to the dehydration of emulsions by distilling the same in contact with porous substances, and also to the impregating of certain carbonaceous substances such as lignite with bituminous residues.

One object of my invention is to provide a simple and effective process for removing the water from oily emulsions.

Some kinds of low grade crude petroleum, particularly certain of the asphaltic crudes of Mexico and California, are so heavily impregnated with moisture that it has hitherto been found impracticable to effect a separation of the water from the mixture so that the oil could be distilled and refined.

By my process I am able to remove the water from such oils and recover distillates therefrom, thus making commercially available certain low grade petroleum emulsions which have hitherto been considered worthless because of the difficulty of effecting their dehydration.

One of the difficulties experienced in the past in efforts to distill such petroleum emulsions is that these liquids when subjected to heat will foam so greatly as to cause a still to boil over. I have found that by distilling these refractory emulsions in the presence of a suitable porous material, such as lignite, undue foaming is prevented by the diffusion of the liquid through the pores of the material, thus preventing the boiling over of the liquid and enabling the continued application of heat to the emulsion until the globules of water have been free from the oil and carried away as vapor.

Another object of my invention is to provide a commercially available process for improving lignite so as to render it suitable for use as a fuel. On account of the large amount of moisture contained in the lignite, as it is usually found, it is not suitable for fuel, and even if the moisture be removed it is still far from being a high grade fuel, as it is hygroscopic, liable to spontaneous combustion and very soft and friable, crumbling up readily when exposed to the weather. According to my invention, I remove the moisture contained in the pores of the lignite, so that it is rendered porous and contact the porous lignite with a suitable bituminous material, apply heat to the mass so that the pores of the lignite become impregnated with the bituminous matter, thereby rendering the lignite suitable for fuel.

In order that my invention may be thoroughly understood, I will now proceed to describe the same in the following specification, and will then point out the novel features thereof in appended claims.

In the accompanying drawings, I have illustrated apparatus adapted for use in carrying out certain features of my invention.

Figure 1 is a partially sectional elevation of an apparatus comprising a plurality of retorts in a heating chamber and designed for carrying out certain features of my invention.

Figure 2 is a plan view with the walls partially broken away and shown in section, of the apparatus shown in Figure 1.

Figure 3 is a vertical section of a modified apparatus designed for carrying out another feature of my invention.

Figure 4 is a sectional plan view taken on the line 4—4 of Figure 3.

In conducting the herein disclosed method of dehydrating oily emulsions I provide a porous material, or a material that becomes more or less porous on the application of heat, such for example, as coal, lignite, peat, brown coal, coke and certain earthy matters of various kinds. However, in order that there may be formed a product which is suitable for use as a fuel, I prefer to employ some such carbonaceous substance as lignite, which is sufficiently porous, when heated, to take up the residuum when in accordance with my invention the distillation is continued after the removal of the water and the oil is reduced to a bituminous residuum.

In carrying out my invention I prefer to first heat the porous material until any moisture therein is driven off. Any light vapors, such as those existing in coal for example, may also be distilled off. The removal of the water and light vapors renders the material porous. The crude petroleum or emulsion, which it is desired to treat, is then contacted with the porous material, and the mass is subjected to heat. Preferably the oil or emulsion is sprayed over the heated porous material and is allowed to percolate through the hot mass. The oil or emulsion on being subjected to the heat forms a froth but is prevented from boiling over by the presence of the porous matter, which absorbs the minute globules of moisture in the emulsion and gives off the moisture gradually in the form of vapor. The water vapors and any oil vapors or gases generated may be removed in any suitable manner, as by means of a vapor line to a condenser. After the removal of the water the distillation may be discontinued and the water-free oil drawn off, leaving the porous material more or less impregnated with the oil.

The process may be carried on continuously, if desired, by continuously contacting the heated porous mass with fresh oil or emulsion and drawing off the water-free oil. It is necessary, of course, in this procedure to occasionaly remove the spent porous material and add fresh portions.

The distillation may be continued after the water has been removed and the oil reduced to any desired degree, distilling the oil to a pitch or coke, if desired. In common practice when petroleum is distilled to coke the residue in the still consists in a hard, tenacious mass adhering to the still bottom, and very difficult to remove. By my process the petroleum residuum instead of adhering to the bottom of the still attaches itself to the particles of porous matter, filling the pores thereof, and may easily be removed from the still. If the porous matter be a lignite or some other suitable carbonaceous material it is found to be in suitable condition for fuel.

One aspect of my invention contemplates the treating of lignite with bituminous matter in order to render the lignite suitable for fuel. The lignite is contacted with a suitable bituminous material subjected to distilling temperatures. Such bituminous materials as crude petroleum and residues resulting from the distillation thereof, acid sludge derived from the treatment of hydrocarbon oils with sulfuric acid, the pitch obtained from such acid sludge, asphalt and various tarry or pitch forming substances may be used to advantage. Among the best substances I have used are acid sludge and the pitch derived therefrom, as sludge is among the cheapest materials obtainable, in fact, in many refining plants it is more or less of a waste product, and it is also a bituminous substance having characteristics which readily commend it for this purpose. The asphaltic petroleums of California and Mexico are also particularly well adapted for this purpose.

In the treating of the lignite a suitable retort or still is charged with the lignite and then the bituminous substance is slowly sprayed over the lignite while applying heat to the mass. In cases, however, where the bituminous matter contains more or less water, as for example, acid sludge or pitch derived therefrom, emulsified crude petroleums or residuums, such for example as some of the Mexican crudes, I have found it unnecessary to spray the bituminous substance and have obtained satisfactory results by charging the retort with the ingredients and then heating the retort, the foaming of the bituminous substance operating to distribute it evenly over the lignite.

In one method of conducting my process I first charge a retort with lignite and apply heat. When substantially all the moisture has been driven off, as is indicated by the presence in the vapor line of a readily ignitable gas in place of the water vapor, I introduce the bituminous substance into the retort in any convenient manner. Preferably the bituminous matter is introduced through the top of the retort and sprayed over the heated lignite. I have found this method especially effective when treating the lignite with Mexican crude.

When utilizing acid sludge in this process the sludge and lignite are placed in a suitable retort and the mixture is subjected to distilling temperatures. The volatile constituents, including water vapor, the hydrocarbon gases and vapors and the sulphur dioxid, are distilled off leaving the lignite impregnated with the tarry residue.

When combining the lignite with a bituminous substance of high melting point, such for example, as pitch from acid sludge, which it is inconvenient to run through pipes, the proper mixture is best obtained by breaking up the pitch into pieces and charging a retort with suitable proportions of the lignite and pitch.

Some mechanical means for stirring or agitating the mass of lignite and bituminous matter may be used, if desired. However, such means are not ordinarily required to successfully conduct the process.

The treated lignite after removal from the retort is found to be water-proof, very little affected by the weather; it burns freely and well in a stove, is not liable to spontaneous combustion, and seems in every respect to be equal in quality to bituminous coal. It may be molded into briquettes if desired. However, this is ordinarily unnecessary as the treated lignite as it comes from the retort is in suitable condition for use as fuel.

As lignite is a relatively poor conductor of heat it is advantageous, when treating it with bituminous material, to heat it in relatively thin layers so that the heat may readily be diffused through the mass. Figures 1 and 2 show apparatus designed for this purpose.

A heating chamber 1, composed of any suitable refractory material, contains a plurality of retorts 2, constructed of relatively small width so that the heat may penetrate to the interior of each. Any convenient means for heating the retorts may be employed but in the type of heating system illustrated waste heat is utilized, the opening 3 being provided for the entrance of the waste heat and being adapted for communication with any convenient source of heat. The spent gases pass out of the heating chamber through the flue 4. The heating chamber is provided with suitable means such as a baffle 5, so as to secure a circulation of heat. This baffle protrudes between the several retorts and helps to support them. It extends for only a portion of the length of the chamber leaving the opening 6 through which the furnace gases pass to the upper portion of the heating chamber, the gases being deflected backward along the sides of the retorts and out through the flue 4. Each retort or still is provided with one or more charging inlets 7, and with a charging line 8 terminating in a spray pipe 9. A number of vapor lines 10 are provided for removing the vapors and gases generated.

In the operation of this apparatus the lignite and the bituminous substance, in case such substance is one having a high melting point, are admitted together through the charging inlets 7 and when the material has been heated for sufficient time the treated lignite is withdrawn through the outlet 11. In case the bituminous substance is a liquid, the best method of operation is to charge the lignite through the inlets 7 and apply heat to the retort while spraying the bituminous substance through the spray pipe 9, over the heated lignite. This appparatus is very efficient in utilizing the sludge acid produced in the refining of petroleum. The sludge and lignite are admitted through the charging inlets 7, the water and sulphur dioxide and other volatile matters are driven off through the vapor line 10, and the lignite becomes impregnated with the tarry residue.

As hereinbefore pointed out it may be desired to carry on in a continuous manner the process herein disclosed of dehydrating emulsions by distilling them in contact with porous substances, and likewise in conducting the process with the primary object of impregnating lignite with a bituminous residue it may be desired to run continuously. Figures 3 and 4 illustrate a retort adapted for such a continuous process and designed to effect an economy in fuel cost through the utilization of waste heat.

The retort 21 may be constructed of iron or other metal, or it may be made of earthenware, the latter construction being desirable in case there is any acid present in any of the materials used. It is illustrated as constructed of fire-clay blocks 22, which are preferably glazed, this construction being suitable for use when it is desired to treat lignite with acid sludge. Circle firebricks may be used advantageously for this purpose. The top and bottom may be constructed of earthenware reinforced by metal. The retort is preferably constructed of considerable length. It is contained in a heating chamber 23, provided with a conduit 24 in communication with a suitable source of heat and with an outlet flue 26. A number of fire-brick fingers 27 serve to hold the retort firmly in place and also act as baffles, causing the heat passing up through the annular heating spaces 25 to circulate thoroughly around the retort. For charging the retort an air-tight hopper 28, operated by any suitable mechanism as 29, is provided. The vapor line 30 is placed in the upper part of the retort to carry off any vapors formed. It may be made of earthenware, if desired. The screw conveyor 31 serves to remove the treated material from the retort. A charging pipe 32 is used for charging liquid into the retort. It is advantageous to arrange a series or battery of these retorts with the heating chamber thereof in communication with the furnaces of a battery of boilers or stills so that the spent gases from the furnaces may pass readily through the conduit 24 to the retorts and thus the process may be carried on with a great fuel economy. If desired, a damper may be placed in the conduit 24 and the outlet 26 may be equipped with a fan or other suction means.

When impregnating lignite with a bituminous substance which is solid at ordinary temperatures the substances employed are admitted to the retort through the hopper 28 and the treated lignite is removed by the screw conveyor 31. When using a liquid bitumiuous substance it may be sprayed into the retort through the pipe 32. This apparatus is well designed for dehydrating oily emulsions such as those of the California and Mexican crudes previously referred to. The porous material is admitted through the hopper 28 and the emulsions are introduced through the pipe 32 and sprayed over the hot mass. The water vapors and also any hydrocarbon vapors generated, are removed through the vapor line 10 and the spent porous material is removed by the conveyor 31. An outlet may be provided near the bottom of the retort for drawing off the water-free oil.

What I claim is.

1. The method of treating emulsified oils which comprises spraying the water-impregnated oil over heated lignite and allowing said oil to percolate through the lignite maintained at a temperature sufficient to distill off the moisture.

2. The method of treating water-impregnated oils which comprises distilling the same while in contact with lignite.

3. The continuous method of dehydrating oil which comprises causing a stream of said oil to constantly come in contact with a mass of heated lignite, continuously removing the water vapors generated and drawing off the water-free oil.

4. The method of treating petroleum containing moisture to remove said moisture which comprises dehydrating the oil by heating the same in the presence of lignite.

In witness whereof, I have hereunto set my hand this 22nd day of October, 1919.

BENJAMIN GALLSWORTHY.